United States Patent
Tetsuo et al.

(10) Patent No.: US 11,518,247 B2
(45) Date of Patent: Dec. 6, 2022

(54) ELECTRIC VEHICLE CONTROLLER

(71) Applicant: Mitsubishi Electric Corporation, Tokyo (JP)

(72) Inventors: Sugahara Tetsuo, Tokyo (JP); Sho Kato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 123 days.

(21) Appl. No.: 16/956,745

(22) PCT Filed: Dec. 28, 2017

(86) PCT No.: PCT/JP2017/047306
§ 371 (c)(1),
(2) Date: Jun. 22, 2020

(87) PCT Pub. No.: WO2019/130563
PCT Pub. Date: Jul. 4, 2019

(65) Prior Publication Data
US 2020/0317058 A1 Oct. 8, 2020

(51) Int. Cl.
*B60L 3/00* (2019.01)
*B60L 53/20* (2019.01)
(Continued)

(52) U.S. Cl.
CPC .............. *B60L 3/0061* (2013.01); *B60K 1/02* (2013.01); *B60L 15/20* (2013.01); *B60L 53/20* (2019.02);
(Continued)

(58) Field of Classification Search
CPC .. B60L 3/023; B60L 3/04; B60L 3/061; B60L 9/18; B60L 9/20; B60L 9/22;
(Continued)

(56) References Cited

U.S. PATENT DOCUMENTS 5,136,218 A * 8/1992 Pessina ..................... B60L 9/00
318/434
5,847,534 A 12/1998 Tanamachi et al.
(Continued)

FOREIGN PATENT DOCUMENTS

| EP | 3200340 A1 * | 8/2017 | ............. H02P 21/18 |
| EP | 3226406 A1 * | 10/2017 | ............. H02P 21/16 |

(Continued)

OTHER PUBLICATIONS

JPO machine translation of JP 2003-219504 (original JP document published Jul. 31, 2003) (Year: 2003).*
(Continued)

*Primary Examiner* — David A Testardi
(74) *Attorney, Agent, or Firm* — Buchanan Ingersoll & Rooney PC

(57) ABSTRACT

A drive control system controls travel of an electric vehicle, the drive control system including a plurality of induction motors, one inverter that drives the plurality of induction motors, and a controller that controls the inverter. The controller includes a coupling disconnection detecting unit that calculates an estimated torque value on the basis of a total current and a voltage command value at the start of the induction motors, and detects disconnection of a coupling provided between the induction motors and a drive mechanism of the electric vehicle on the basis of the estimated torque value calculated and a torque command value.

6 Claims, 10 Drawing Sheets

(51) Int. Cl.
*B60L 15/20* (2006.01)
*B60K 1/02* (2006.01)

(52) U.S. Cl.
CPC ... *B60L 2240/429* (2013.01); *B60L 2240/529* (2013.01)

(58) Field of Classification Search
CPC .... B60L 15/0081; B60L 15/025; B60L 15/20; B60L 2200/26; B60L 3/0023; B60L 3/0061; B60L 53/20; H02P 21/24–32; H02P 29/024; H02P 29/032
See application file for complete search history.

(56) References Cited

U.S. PATENT DOCUMENTS

| | | | | |
|---|---|---|---|---|
| 6,307,759 | B1* | 10/2001 | Inarida | H02M 5/4585 363/37 |
| 2002/0149417 | A1* | 10/2002 | Kumano | B60L 9/005 327/552 |
| 2004/0200654 | A1* | 10/2004 | Hatsuda | B60K 6/54 903/917 |
| 2006/0043917 | A1 | 3/2006 | Kifuku et al. | |
| 2008/0100256 | A1* | 5/2008 | Maruyama | B60L 3/003 318/801 |
| 2008/0129231 | A1* | 6/2008 | Toda | B60L 15/38 318/112 |
| 2009/0039808 | A1* | 2/2009 | Hashimoto | F04B 35/04 318/400.02 |
| 2009/0079370 | A1* | 3/2009 | Nakamura | H02P 29/50 318/400.02 |
| 2010/0191399 | A1* | 7/2010 | Kono | B61K 9/12 701/22 |
| 2010/0194322 | A1* | 8/2010 | Negoro | H02M 1/32 318/454 |
| 2011/0144848 | A1* | 6/2011 | Yoshizue | B60L 3/0061 701/22 |
| 2011/0316460 | A1* | 12/2011 | Yasuoka | B60L 3/0069 318/400.22 |
| 2012/0209467 | A1* | 8/2012 | Kono | B60L 3/0023 701/22 |
| 2012/0212168 | A1* | 8/2012 | Tsukima | B60L 9/18 318/400.26 |
| 2013/0113398 | A1* | 5/2013 | Kato | H02P 21/24 318/400.02 |
| 2013/0191006 | A1* | 7/2013 | Iseda | B60L 3/104 701/102 |
| 2013/0320900 | A1* | 12/2013 | Daigle | B60L 50/13 318/434 |
| 2014/0111130 | A1* | 4/2014 | Yamada | B60L 3/102 318/400.32 |
| 2014/0176028 | A1* | 6/2014 | Tobari | B60L 15/20 318/400.02 |
| 2014/0312821 | A1* | 10/2014 | Kitanaka | H02P 21/22 318/434 |
| 2014/0354204 | A1* | 12/2014 | Tachibana | H02P 6/08 318/473 |
| 2014/0368137 | A1* | 12/2014 | Taniguchi | H02P 21/06 318/400.04 |
| 2015/0188473 | A1* | 7/2015 | Kakizaki | H02P 6/12 318/400.02 |
| 2016/0142004 | A1* | 5/2016 | Otani | H02P 27/085 318/806 |
| 2016/0229433 | A1* | 8/2016 | Traylor | B61L 15/0081 |
| 2016/0236698 | A1* | 8/2016 | Kupiec | B61L 3/006 |
| 2017/0264232 | A1* | 9/2017 | Iezawa | H02P 29/50 318/400.02 |
| 2017/0320402 | A1* | 11/2017 | Konishi | H02P 6/08 318/473 |
| 2021/0328537 | A1* | 10/2021 | Iwaji | B60L 9/18 318/400.26 |

FOREIGN PATENT DOCUMENTS

| | | | | |
|---|---|---|---|---|
| JP | H09-056005 A | | 2/1997 | |
| JP | 2003134603 A | * | 5/2003 | |
| JP | 2003219504 A | * | 7/2003 | |
| JP | 2004080936 A | * | 3/2004 | B60L 15/025 |
| JP | 2005176571 A | * | 6/2005 | |
| JP | 2008167586 A | * | 7/2008 | B60L 15/025 |
| JP | 4319112 B2 | | 8/2009 | |
| JP | 2011173441 A | | 9/2011 | |
| JP | 4860012 B2 | | 1/2012 | |
| JP | 2013135501 A | * | 7/2013 | |
| JP | 2014158419 A | | 8/2014 | |

OTHER PUBLICATIONS

EPO machine translation of JP 2013-135501 (original JP document published Jul. 8, 2013) (Year: 2013).*
Perna, Domenico et al., "An Assisted Speed-Sensorless Control of Induction Motor Drives for Railway Applications", 2016 Int'l. Conf. on Electrical Systems for Aircraft, Railway, Ship Propulsion and Road Vehicles & Int'l. Transportation Electrification Conf. (ESARS-ITEC), Nov. 2-4, 2016, IEEE, 7 pages (Year: 2016).*
Office Action dated Mar. 19, 2021, in corresponding India Patent Application No. 202027021579, including English translation of the Office Action. (5 pages).
International Search Report (PCT/ISA/210) dated Mar. 13, 2018, by the Japan Patent Office as the International Searching Authority for International Application No. PCT/JP2017/047306.
Written Opinion (PCT/ISA/237) dated Mar. 13, 2018, by the Japan Patent Office as the International Searching Authority for International Application No. PCT/JP2017/047306.

* cited by examiner

ELECTRIC VEHICLE CONTROLLER

FIELD

The present invention relates to an electric vehicle controller applied to an electric vehicle driven by a plurality of induction motors that is driven by one inverter.

BACKGROUND

As illustrated in Patent Literature 1 below, a conventional electric vehicle controller typically drives an electric vehicle by controlling torque generated by a motor that is connected to an axle of wheels mounted on a bogie of a motor car via a gear and a coupling. An induction motor is typically used as the motor.

Patent Literature 2 below discloses an electric vehicle controller that prevents an abnormal increase in the rotational speed of a motor by stopping the operation of an inverter when the rotational speed of the motor detected by a speed sensor exceeds the maximum speed set value.

CITATION LIST

Patent Literature

Patent Literature 1: Japanese Patent Application Laid-open No. 2011-173441
Patent Literature 2: Japanese Patent Application Laid-open No. 2014-158419

SUMMARY

Technical Problem

In an electric vehicle, a coupling that serves as a connecting member for connecting an induction motor and a gear may be disconnected during travel. Meanwhile, an electric vehicle driven by a plurality of induction motors is subjected to traction by induction motors whose couplings are not disconnected even if some of the plurality of induction motors are disconnected.

In the control that uses the value detected by the speed sensor as in Patent Literature 2 above, the rotational speeds of the axles to which the induction motors are connected can be detected individually. Thus, disconnection of the coupling can easily be detected by detecting a difference in the rotational speeds of the axles. On the other hand, in an electric vehicle controller performing so-called speed sensorless control that does not use a value detected by a speed sensor for control, the rotational speeds of the axles to which the induction motors are connected cannot be detected individually. Thus, in the electric vehicle controller performing the speed sensorless control, there is a need for a technique that detects disconnection of the coupling by an easy method.

The present invention has been made in view of the above, and an object of the present invention is to provide an electric vehicle controller that can detect disconnection of a coupling by an easy method.

Solution to Problem

The present invention according to an aspect thereof includes a drive control system including a plurality of induction motors, one inverter that drives the plurality of the induction motors, a current detector that detects a total current that is a sum of motor currents flowing to corresponding ones of the induction motors, and a controller that controls the inverter on the basis of a current command value calculated on the basis of a torque command value, a voltage command value calculated on the basis of the total current detected, and an estimated speed value calculated on the basis of the voltage command value calculated and the total current detected. Travel of an electric vehicle is controlled by the drive control system. The controller includes a coupling disconnection detecting unit that calculates an estimated torque value on the basis of the total current and the voltage command value, and detects disconnection of a coupling provided between the induction motors and a drive mechanism of the electric vehicle on the basis of the estimated torque value calculated and the torque command value.

Advantageous Effects of Invention

According to the present invention, the electric vehicle controller can detect disconnection of the coupling by an easy method.

DESCRIPTION OF EMBODIMENTS

An electric vehicle controller according to embodiments of the present invention will now be described in detail with reference to the drawings. Note that the present invention is not limited to the following embodiments. Also, in the following description, physical connection and electrical connection are not distinguished from each other, and are simply referred to as "connection".

First Embodiment

Figure 1:
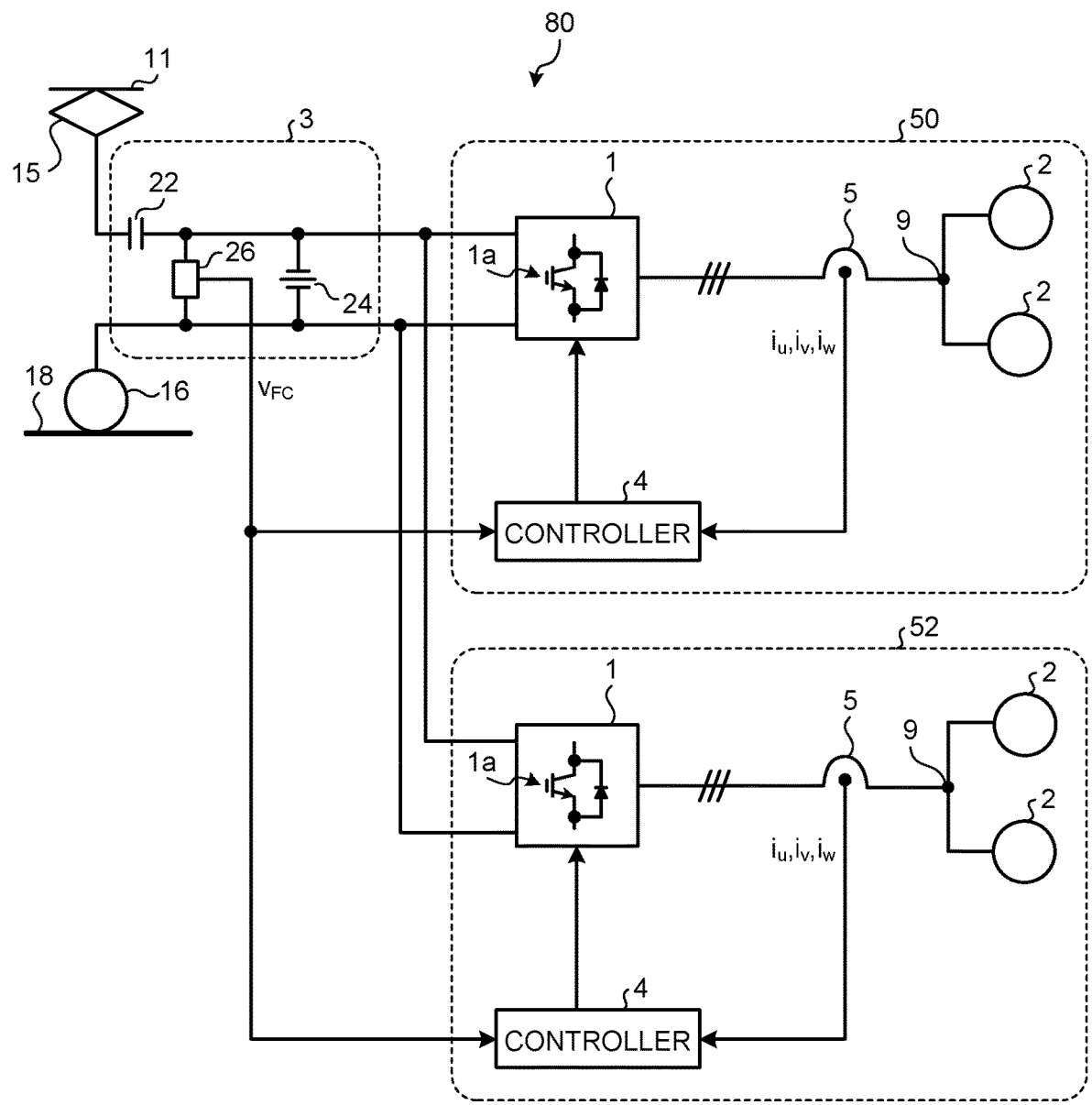
FIG. 1 is a block diagram of an electric vehicle drive system including an electric vehicle controller according to a first embodiment.

FIG. 1 is a block diagram of an electric vehicle drive system 80 including an electric vehicle controller according to a first embodiment. FIG. 1 is an example of application to a DC electric vehicle. As illustrated in FIG. 1, the electric vehicle drive system 80 according to the first embodiment includes an input circuit 3, a first drive group 50, and a second drive group 52. The first drive group 50 constitutes a first drive control system, and the second drive group 52 constitutes a second drive control system. The first drive group 50 and the second drive group 52 control travel of the electric vehicle.

On the input side of the input circuit 3, a positive side of the input circuit 3 is connected to an overhead line 11 via a pantograph 15, and a negative side of the input circuit 3 is in contact with a rail 18 via a wheel 16. The first drive group 50 and the second drive group 52 are connected in parallel on the output side of the input circuit 3. These connections form one electric circuit including the overhead line 11, the pantograph 15, the input circuit 3, the first drive group 50, the wheel 16, and the rail 18. Another electric circuit is formed including the overhead line 11, the pantograph 15, the input circuit 3, the second drive group 52, the wheel 16, and the rail 18.

The input circuit 3 is supplied with power from the overhead line 11 via the pantograph 15. The power from the overhead line 11 via the pantograph 15 and the input circuit 3 is also supplied to the first drive group 50 and the second drive group 52.

The input circuit 3 includes a circuit breaker 22, a filter capacitor 24, and a voltage detector 26. The circuit breaker 22 opens or closes the connection between the overhead line 11, and the first drive group 50 and the second drive group 52. The filter capacitor 24 smooths and stores the power supplied from the overhead line 11. The voltage detector 26 detects a voltage of the filter capacitor 24.

The first drive group 50 includes an inverter 1, two induction motors 2, a controller 4 (e.g., inverter controller), and a current detector 5.

A connection terminal of the inverter 1 on a high potential side is connected to the pantograph 15 via the circuit breaker 22 of the input circuit 3, and a connection terminal of the inverter 1 on a low potential side is electrically connected to the wheel 16 through the input circuit 3. The inverter 1 is a power converter that converts DC supplied from the input circuit 3 into AC with variable voltage and frequency. The two induction motors 2 are connected to an AC side of the inverter 1. Note that for the inverter 1, the side corresponding to the input circuit 3 is referred to as a "DC side", and the side corresponding to the induction motors 2 is referred to as the "AC side". The inverter 1 drives the two induction motors 2. The two induction motors 2 provide a driving force to the electric vehicle.

The current detector 5 is disposed between the inverter 1 and a connection point 9 of the two induction motors 2. The current detector 5 detects total currents $i_u$, $i_v$, and $i_w$ being a sum of motor currents flowing to the two induction motors 2. The motor current is a phase current flowing in each phase of one induction motor 2. The total currents $i_u$, $i_v$, and $i_w$ detected by the current detector 5 are input to the controller 4.

The controller 4 receives a filter capacitor voltage $v_{FC}$, which is a value detected by the voltage detector 26, in addition to the total currents $i_u$, $i_v$, and $i_w$ described above. The controller 4 generates gate drive signals for driving a switching element 1a of the inverter 1 on the basis of the information on the total currents $i_u$, $i_v$, and $i_w$, rotational speed $\omega_d$, and the filter capacitor voltage $v_{FC}$, and outputs the gate drive signals to the inverter 1. The controller 4 generates therein pulse width modulation (PWM) signals for performing PWM control on the inverter 1 serving as the power converter. The gate drive signals are generated using the PWM signals.

The second drive group 52 is configured similarly to the first drive group 50. Each component of the second drive group 52 is the same as that of the first drive group 50, whereby a description thereof will be omitted.

Although FIG. 1 is the example of application to the DC electric vehicle, the present invention is also applicable to an AC electric vehicle. In the case of the AC electric vehicle, the input circuit 3 has a different configuration, but the controller 4 has an equivalent basic configuration. Moreover, although FIG. 1 illustrates two drive groups including the first drive group 50 and the second drive group 52, it is needless to say that the present invention can be applied to three or more drive groups. Also, although FIG. 1 illustrates the example in which the two induction motors 2 are connected to the one inverter 1, the present invention is not limited to this example. A vehicle on which the induction motor 2 is mounted typically has a configuration in which one vehicle has two bogies with two induction motors mounted on each bogie. Therefore, when one controller 4 is mounted on one vehicle in this typical configuration, the one controller 4 drives four of the induction motors 2.

As described above, the electric vehicle drive system 80 according to the first embodiment has the configuration in which the one inverter 1 drives the plurality of induction motors 2 that drives the electric vehicle. The controller 4 is included in the electric vehicle controller according to the first embodiment. Moreover, the electric vehicle drive system 80 according to the first embodiment is not provided with a speed sensor for detecting the rotational speed of the induction motors 2. That is, the controller 4 according to the first embodiment is a controller that performs so-called speed sensorless control that does not use a value detected by a speed sensor for control. Note that the function of the controller 4 is the same in each drive group. Therefore, the following description focuses on one of the controllers 4 that controls one of the drive groups.

Figure 2:
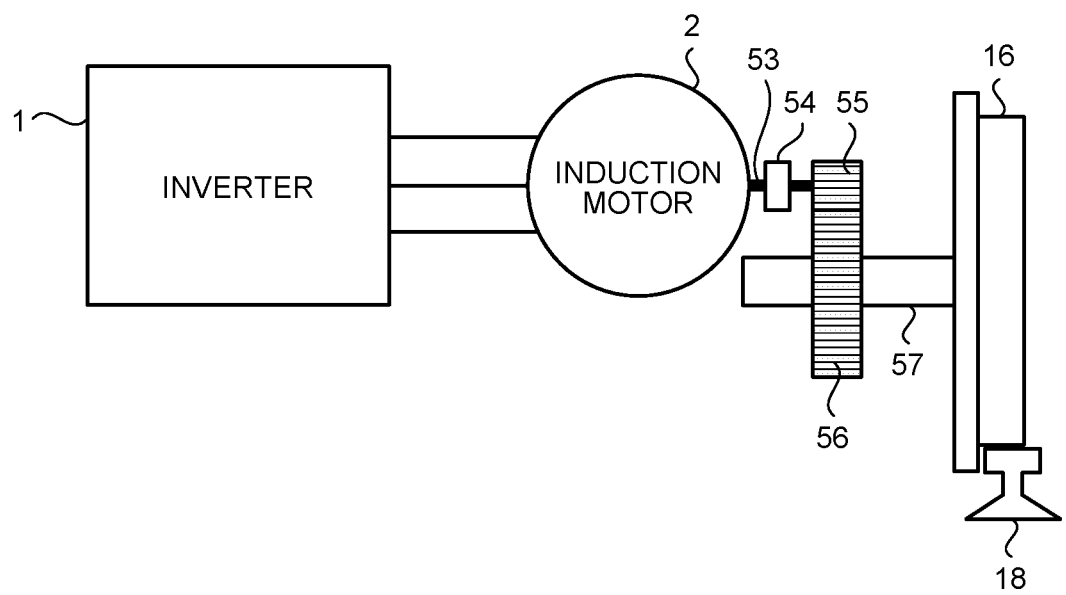
FIG. 2 is a diagram illustrating a schematic configuration of a drive mechanism between a wheel and an induction motor of an electric vehicle.

FIG. 2 is a diagram illustrating a schematic configuration of a drive mechanism between the wheel 16 and the induction motor 2 of the electric vehicle. As illustrated in FIG. 2, a coupling 54 as a connecting member is provided on a rotary shaft 53 of the induction motor 2, and is connected to a motor-side gear 55. A wheel-side gear 56 is disposed to be in mesh with the motor-side gear 55. The wheel-side gear 56 is fixed to an axle 57. The motor-side gear 55 and the wheel-side gear 56 are included as gears of the electric vehicle. The wheel 16 is connected to the axle 57. Thus, the output side of the induction motor 2 is provided with a mechanism for conveying the mechanical output of the induction motor 2 to the wheel 16 via the axle 57. The electric vehicle drives the wheel 16 to rotate, and travels on the rail 18 with which the wheel 16 is in contact.

Figure 3:
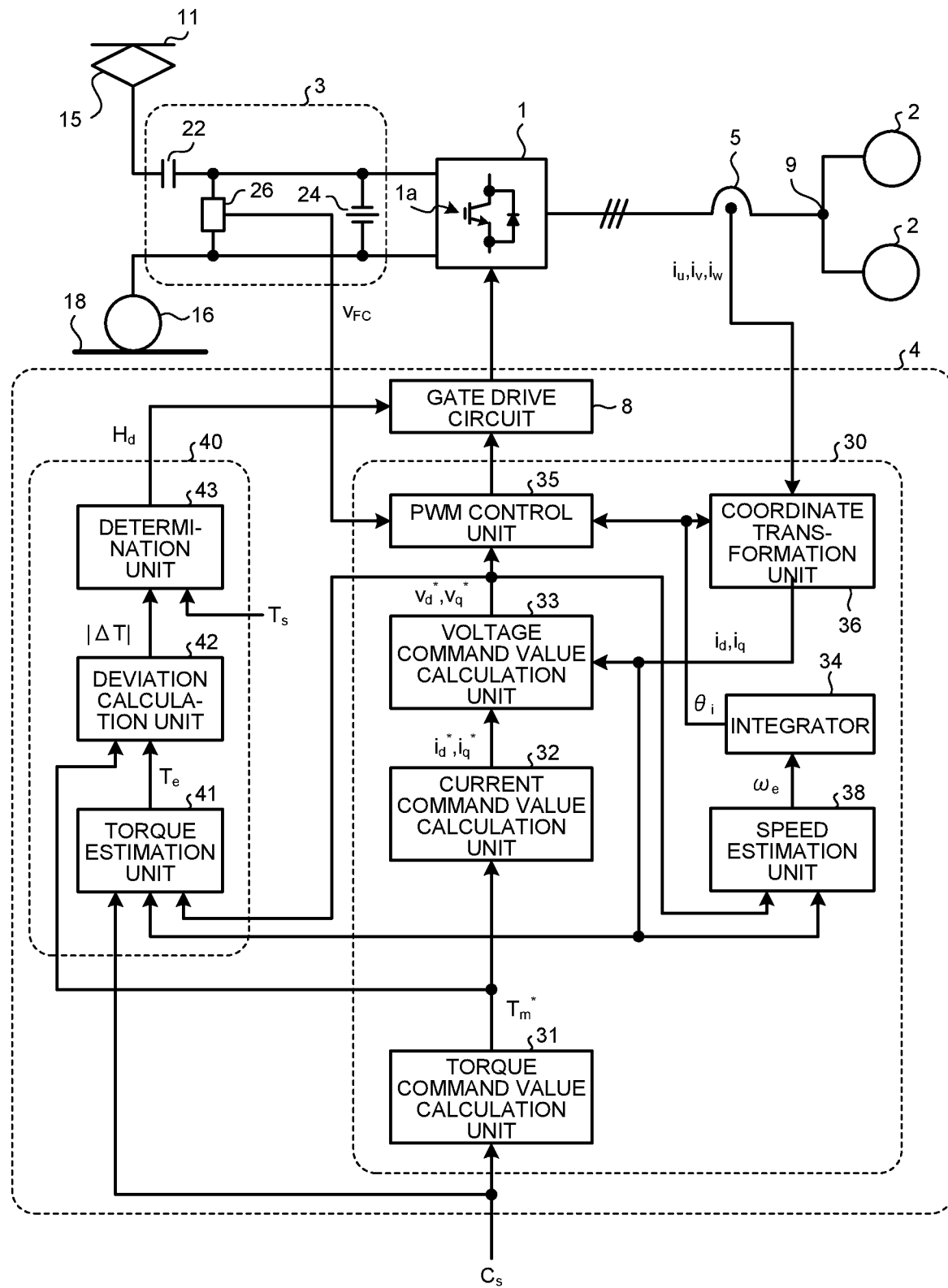
FIG. 3 is a block diagram illustrating a detailed configuration of a controller according to the first embodiment.

FIG. 3 is a block diagram illustrating a detailed configuration of the controller 4 according to the first embodiment. In FIG. 3, a part identical or equivalent to a part illustrated in FIG. 1 is indicated with the same reference numeral as that assigned to the part in FIG. 1.

The controller 4 includes a gate drive circuit 8, a voltage controller 30, and a coupling disconnection detecting unit 40.

The gate drive circuit 8 generates the gate drive signals for driving the switching element 1a of the inverter 1 and outputs the gate drive signals to the inverter 1. The voltage controller 30 generates the PWM signals for performing PWM control on the inverter 1 and outputs the PWM signals to the gate drive circuit 8. The coupling disconnection detecting unit 40 detects whether or not coupling disconnection has occurred in the induction motor 2 to be driven.

The voltage controller 30 includes a torque command value calculation unit 31, a current command value calculation unit 32, a voltage command value calculation unit 33, an integrator 34, a PWM control unit 35, a coordinate transformation unit 36, and a speed estimation unit 38.

The coordinate transformation unit 36 transforms the total currents $i_u$, $i_v$, and $i_w$ detected by the current detector 5 into current values corresponding to d-axis and q-axis that are two axes in a rotating reference frame. The current values obtained after transformation are d-axis current $i_d$ and q-axis current $i_q$. The d-axis is an axis called a flux axis, and the q-axis is an axis called a torque axis. The d-axis and q-axis are in orthogonal relationship in terms of vectors. The transformation processing performed by the coordinate transformation unit 36 is known, and a description thereof will be omitted. The d-axis current $i_d$ and the q-axis current $i_q$ obtained after the transformation by the coordinate transformation unit 36 are input to the voltage command value calculation unit 33, the speed estimation unit 38, and the coupling disconnection detecting unit 40.

A start command $C_s$ is input to the torque command value calculation unit 31. The start command $C_s$ is a command that is output when traveling of the electric vehicle is to be started. The torque command value calculation unit 31 calculates a torque command value $T_m^*$ upon being triggered by the input of the start command $C_s$. The torque command value $T_m^*$ is a command value of the torque to be output by the induction motors 2.

The torque command value $T_m^*$ calculated by the torque command value calculation unit 31 is input to the current command value calculation unit 32. On the basis of the torque command value $T_m^*$, the current command value calculation unit 32 calculates a q-axis current command value $i_q^*$ that is a current command value for the torque axis, and a d-axis current command value $i_d^*$ that is a current command value for the flux axis. The calculation processing in the current command value calculation unit 32 is known, and a description thereof will be omitted. The q-axis current command value $i_q^*$ and the d-axis current command value $i_d^*$ calculated by the current command value calculation unit 32 are input to the voltage command value calculation unit 33.

The voltage command value calculation unit 33 calculates a d-axis voltage command value $v_d^*$ and a q-axis voltage command value $v_q^*$ on the basis of the d-axis current command value $i_d^*$ and q-axis current command value $i_q^*$ calculated by the current command value calculation unit 32, and on the basis of the d-axis current $i_d$ and q-axis current $i_q$ output from the coordinate transformation unit 36. The voltage command value is a command value of the voltage output by the inverter 1. In the case of vector control, a general method is to perform calculations separately in the d-axis direction and the q-axis direction. The calculation processing in the voltage command value calculation unit 33 is known, and a description thereof will be omitted. The d-axis voltage command value $v_d^*$ and q-axis voltage command value $v_q^*$ calculated by the voltage command value calculation unit 33 are input to the PWM control unit 35, the speed estimation unit 38, and the coupling disconnection detecting unit 40.

To the speed estimation unit 38, the d-axis current $i_d$ and q-axis current $i_q$ obtained by the transformation by the coordinate transformation unit 36, and the d-axis voltage command value $v_d^*$ and q-axis voltage command value $v_q^*$ calculated by the voltage command value calculation unit 33, are input. The speed estimation unit 38 calculates an estimated speed value $\omega_e$ on the basis of the d-axis current $i_d$ and q-axis current $i_q$, and the d-axis voltage command value $v_d^*$ and q-axis voltage command value $v_q^*$. The estimated speed value $\omega_e$ calculated by the speed estimation unit 38 is input to the integrator 34. Note that a method of calculating the estimated speed value $\omega_e$ is known, and a detailed description thereof will be omitted. For a specific method of calculation, refer to the content of the publication disclosed in Japanese Patent No. 4437629, for example.

The integrator 34 calculates an angular frequency by internal calculation on the basis of the estimated speed value $\omega_e$ being input, and integrates the calculated angular frequency to calculate a phase $\theta_i$. The angular frequency can be generated by adding the slip velocity of the induction motors 2 to the estimated speed value $\omega_e$. The phase $\theta_i$ calculated by the integrator 34 is input to the PWM control unit 35 and the coordinate transformation unit 36. The coordinate transformation unit 36 uses the phase $\theta_i$ when calculating the d-axis current $i_d$ and the q-axis current $i_q$.

The PWM control unit 35 generates the PWM signals for performing PWM control on the switching element 1a of the inverter 1 on the basis of the phase $\theta_i$, the d-axis voltage command value $v_d^*$ and q-axis voltage command value $v_q^*$, and the filter capacitor voltage $v_{FC}$. The processing of generating the PWM signals is known, and a description thereof will be omitted.

Next, the coupling disconnection detecting unit 40 will be described. As illustrated in FIG. 3, the coupling disconnection detecting unit 40 includes a torque estimation unit 41, a deviation calculation unit 42, and a determination unit 43.

The coupling disconnection detecting unit 40 is a detection unit that detects disconnection of the coupling 54 provided on the rotary shaft 53 of the induction motor 2. When the induction motor 2 with the coupling 54 disconnected is driven, there is a difference between the torque command value $T_m^*$ calculated on the basis of the start command $C_s$ and an estimated torque value $T_e$ calculated on the basis of the total currents $i_u$, $i_v$, and $i_w$ detected by the current detector 5, and coupling disconnection can be detected by the difference. The difference is particularly noticeable at startup. Note that "at startup" includes not only a case where the vehicle shifts from rest to a traveling state, but also a case where the vehicle accelerates again from a coasting state. Moreover, the difference in this case is not a difference caused by accident or error, but a significant difference. The coupling disconnection detecting unit 40 illustrated in FIG. 3 is configured using this principle.

To the torque estimation unit 41, the d-axis current $i_d$ and q-axis current $i_q$ obtained by the transformation by the coordinate transformation unit 36, the d-axis voltage command value $v_d^*$ and q-axis voltage command value $v_q^*$ calculated by the voltage command value calculation unit 33, and the start command $C_s$, are input. When the start command $C_s$ is input, the torque estimation unit 41 calculates the estimated torque value $T_e$ on the basis of the d-axis current $i_d$, the q-axis current $i_q$, the d-axis voltage command value $v_d^*$, and the q-axis voltage command value $v_q^*$. The estimated torque value $T_e$ is not a value input or instructed from outside, but an estimated value of torque calculated by a control parameter inside the controller 4. The estimated torque value $T_e$ calculated by the torque estimation unit 41 is input to the deviation calculation unit 42.

To the deviation calculation unit 42, the torque command value $T_m^*$ is input in addition to the estimated torque value $T_e$. The deviation calculation unit 42 calculates an absolute value |ΔT| of the deviation between the torque command value $T_m^*$ and the estimated torque value $T_e$. The absolute value |ΔT| of the deviation is input to the determination unit 43.

To the determination unit 43, a reference value $T_s$ is input in addition to the absolute value |ΔT| of the deviation. The reference value $T_s$ is a threshold for detecting coupling disconnection. The determination unit 43 compares the absolute value |ΔT| of the deviation with the reference value $T_s$, and determines that coupling disconnection has occurred when the absolute value |ΔT| of the deviation is larger than the reference value $T_s$. The determination unit 43 outputs a disconnection detection signal $H_d$ when determining that coupling disconnection has occurred. The disconnection detection signal $H_d$ is output to the gate drive circuit 8. The disconnection detection signal $H_d$ is a control signal for forcibly stopping the operation of the gate drive circuit 8. While the disconnection detection signal $H_d$ is being output, the gate drive circuit 8 stops outputting the gate drive signals to the inverter 1 even if the PWM signals are input from the PWM control unit 35.

Note that although the coupling disconnection detecting unit 40 above is configured to input the start command $C_s$ to the torque estimation unit 41, the start command $C_s$ may be input to the determination unit 43. In the case of this configuration, the processings by the torque estimation unit 41, the deviation calculation unit 42, and the determination unit 43 are always performed regardless of the input of the start command $C_s$. Then, with the input of the start command $C_s$, a result of determination by the determination unit 43 is output to the gate drive circuit 8. Alternatively, regardless of the input of the start command $C_s$, the processings by the torque estimation unit 41 and the deviation calculation unit 42 are always performed. Then, with the input of the start command $C_s$, the determination unit 43 starts the operation, and a result of determination by the determination unit 43 is output to the gate drive circuit 8.

Figure 4:
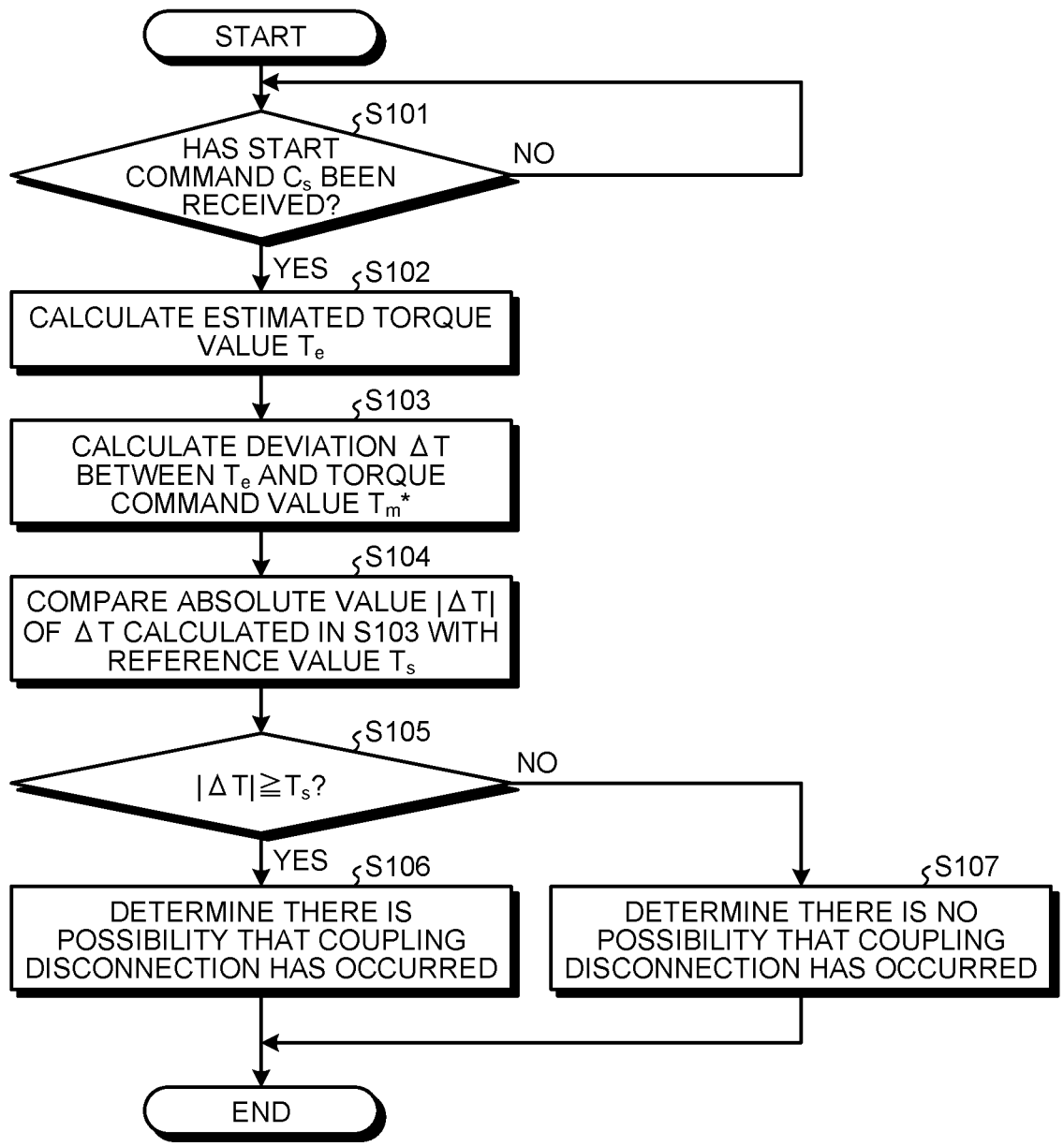
FIG. 4 is a flowchart illustrating an operation flow for detecting coupling disconnection in the first embodiment.

Next, an operation of detecting coupling disconnection in the first embodiment will be described with reference to FIGS. 3 and 4. FIG. 4 is a flowchart illustrating an operation flow for detecting coupling disconnection in the first embodiment. In FIG. 4, the processings in steps S101 and S102 are executed by the torque estimation unit 41, the processing in step S103 is executed by the deviation calculation unit 42, and the processings in steps S104 to S107 are executed by the determination unit 43.

In step S101, it is determined whether or not the start command $C_s$ has been received. If the start command $C_s$ has not been received (No in step S101), the processing in step S101 is repeated. If the start command $C_s$ has been received (Yes in step S101), the processing proceeds to step S102.

In step S102, the estimated torque value $T_e$ is calculated. In step S103, the deviation ΔT between the estimated torque value $T_e$ and the torque command value $T_m^*$ is calculated. In step S104, the absolute value |ΔT| of the deviation ΔT calculated in step S103 is compared with the reference value $T_s$.

Here, if the absolute value |ΔT| is greater than or equal to the reference value $T_s$ (Yes in step S105), the processing proceeds to step S106. In step S106, it is determined that "coupling disconnection has occurred", and the processing flow in FIG. 4 is ended.

On the other hand, if the absolute value |ΔT| is less than the reference value $T_s$ (No in step S105), the processing proceeds to step S107. In step S107, it is determined that "coupling disconnection has not occurred", and the processing flow in FIG. 4 is ended.

Note that in the determination processing in step S105 above, if the absolute value |ΔT| is equal to the reference value $T_s$, the determination is "Yes" and the processing proceeds to step S106, but the determination may be "No" and the processing may proceed to step S107. That is, the determination may be either "Yes" or "No" if the absolute value |ΔT| is equal to the reference value $T_s$.

As described above, the electric vehicle controller according to the first embodiment can detect coupling disconnection of the induction motors 2 on the basis of the torque command value $T_m^*$ and the estimated torque value $T_e$. The method of the first embodiment need only use command information about the torque that is the torque command value $T_m^*$ and estimated information about the torque that is the estimated torque value $T_e$, whereby coupling disconnection of the induction motors 2 can be detected by a simple method.

Moreover, the electric vehicle controller according to the first embodiment can detect coupling disconnection of some of the plurality of induction motors 2, and stop the drive of the drive group including the induction motor 2 for which coupling disconnection has been detected. As a result, even when the drive of only one drive group including the induction motor 2 experiencing coupling disconnection is stopped, the operation of the electric vehicle can be continued by another drive group.

Figure 5:
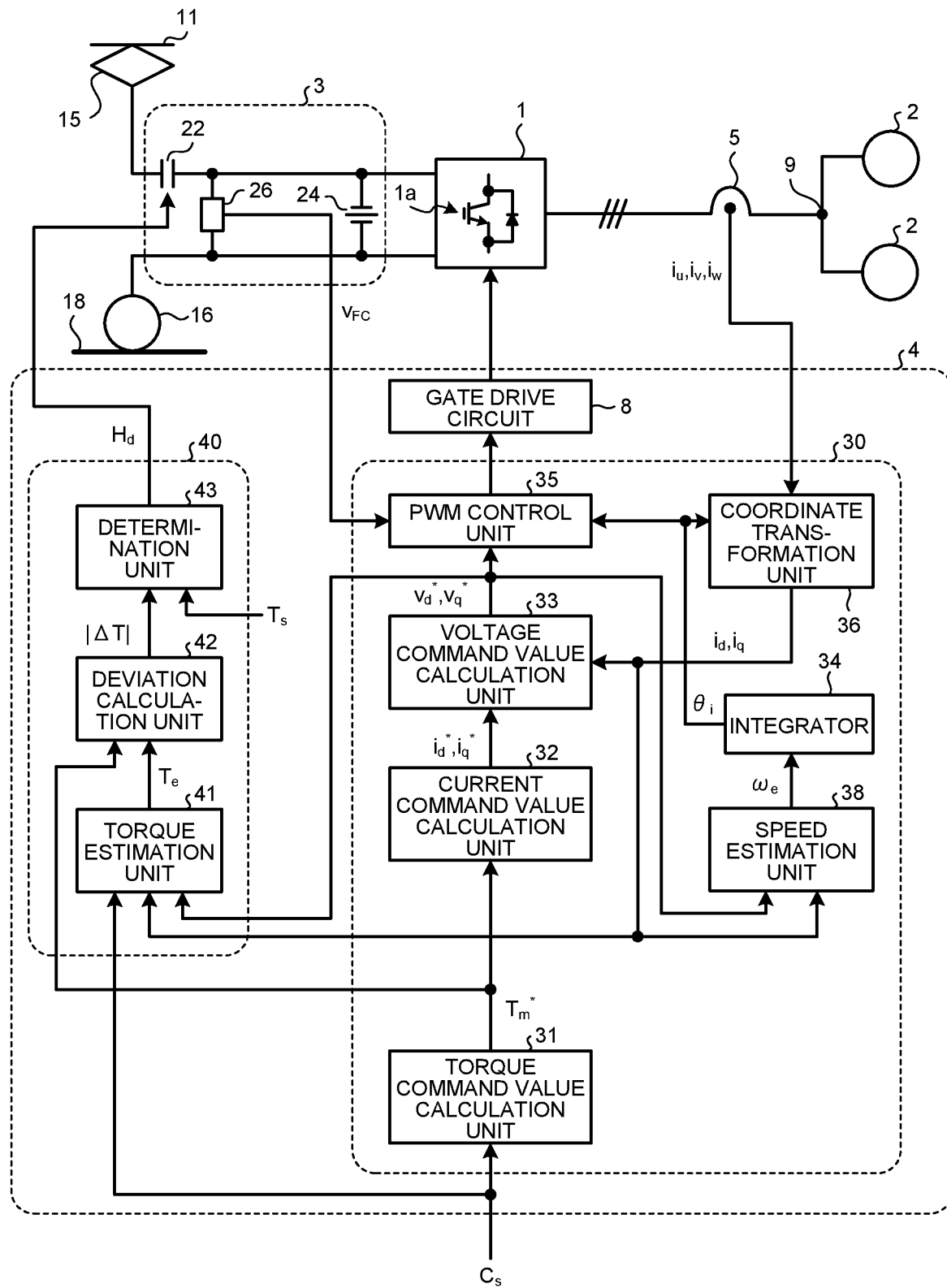
FIG. 5 is a block diagram illustrating an example of the configuration of the controller according to the first embodiment, the configuration being different from that of FIG. 3.

FIG. 5 is a block diagram illustrating an example of the configuration of the controller 4 according to the first embodiment, the configuration being different from that of FIG. 3. The difference from FIG. 3 is the destination to which the disconnection detection signal $H_d$ is output. That is, the disconnection detection signal $H_d$ is output to the gate drive circuit 8 in FIG. 3, whereas in FIG. 5, the disconnection detection signal $H_d$ is output to the circuit breaker 22. The circuit breaker 22 that has received the disconnection detection signal $H_d$ cuts off the power supplied from the overhead line 11 by opening a contact (not shown).

The configuration of FIG. 3 has an advantage that the operation of the electric vehicle can be continued. On the other hand, the configuration of FIG. 5 cannot stop the drive of only one drive group including the induction motor 2 experiencing coupling disconnection, thereby not being able to continue the operation of the electric vehicle. However, the configuration of FIG. 5 has an advantage in that the operation of the electric vehicle can be stopped promptly because the power supply can be cut off on the side closer to the overhead line 11. In the electric vehicle, a decrease in the number of induction motors 2 that can contribute to driving of the vehicle results in an increase in the load on one induction motor 2. Therefore, an unintended large current may flow through each induction motor 2. The configuration of FIG. 5 is effective for avoiding such a situation.

Second Embodiment

Figure 6:
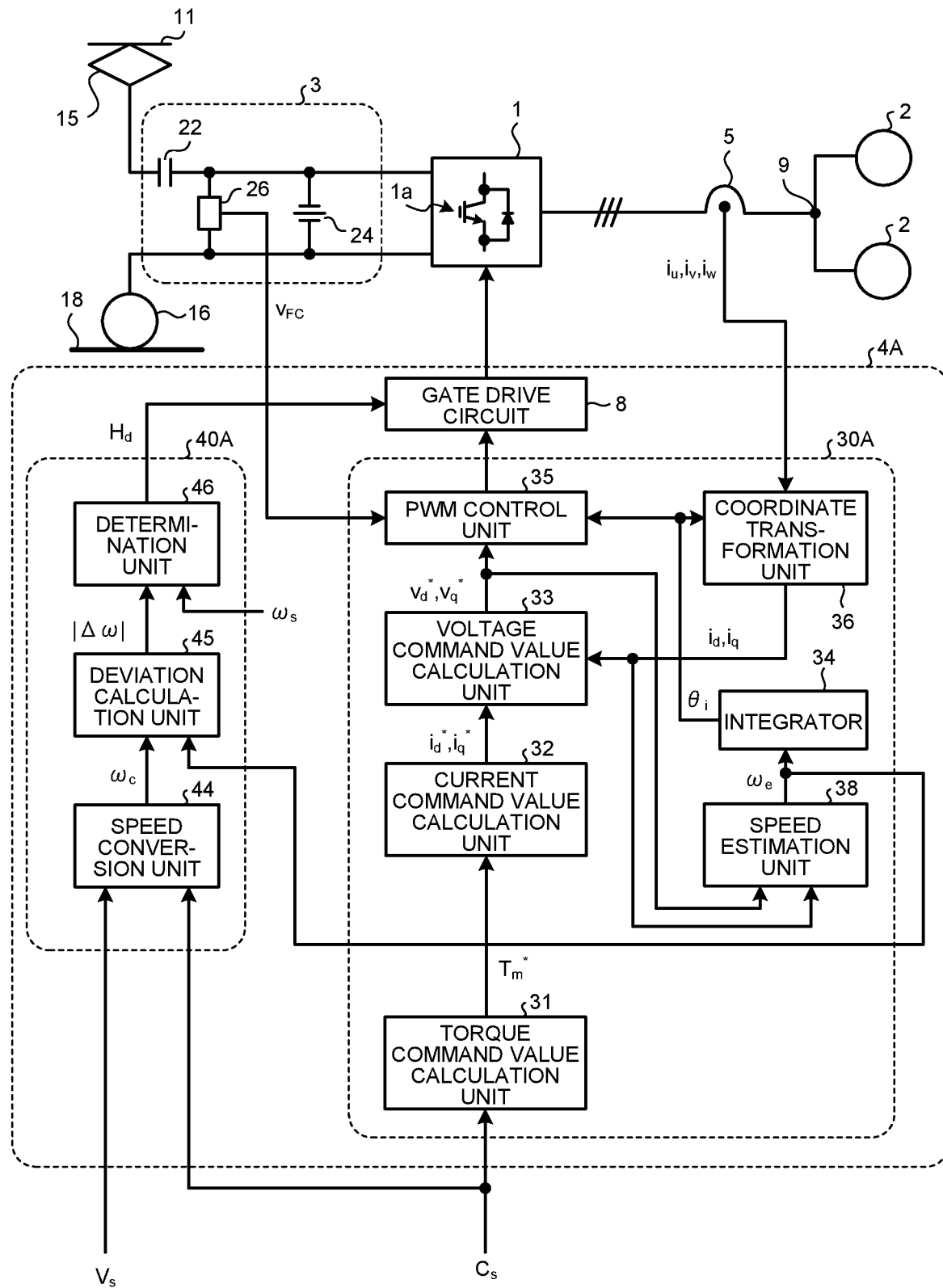
FIG. 6 is a block diagram illustrating a detailed configuration of a controller according to a second embodiment.

FIG. 6 is a block diagram illustrating a detailed configuration of a controller 4A according to a second embodiment. The controller 4A according to the second embodiment includes a voltage controller 30A and a coupling disconnection detecting unit 40A.

The coupling disconnection detecting unit 40A is obtained by changing the configurations of the coupling disconnection detecting unit 40 of the first embodiment illustrated in FIG. 3 from the torque estimation unit 41 to a speed conversion unit 44, the deviation calculation unit 42 to a deviation calculation unit 45, and the determination unit 43 to a determination unit 46. Note that the other configurations are identical or equivalent to those of the first embodiment except for input/output signals and are thus denoted by the same reference numerals as those in the first embodiment, whereby a redundant description will be omitted. The input/output signals will be described later.

The coupling disconnection detecting unit 40A is a detection unit that detects disconnection of the coupling 54 provided on the rotary shaft 53 of the induction motor 2. When the induction motor 2 with the coupling 54 disconnected is driven, there is a difference between the actual rotational speed of the induction motor 2 and the estimated speed value $\omega_e$ calculated on the basis of the total currents $i_u$, $i_v$, and $i_w$ detected by the current detector 5, and coupling disconnection can be detected by the difference. The difference is particularly noticeable at startup. The coupling disconnection detecting unit 40A illustrated in FIG. 6 is configured using this principle.

A vehicle speed $V_s$, which is vehicle speed information from outside, is input to the speed conversion unit 44. As the vehicle speed information, information on the traveling speed managed by a train or actual detected information about the traveling speed may be used. The speed conversion unit 44 converts the vehicle speed $V_s$ into a converted speed $\omega_c$. The converted speed $\omega_c$ is a converted value obtained by converting the vehicle speed $V_s$ into the rotational speed of the induction motor 2. The converted speed $\omega_c$ calculated by the speed conversion unit 44 is input to the deviation calculation unit 45.

The deviation calculation unit 45 receives the estimated speed value $\omega_e$ in addition to the converted speed $\omega_c$. The deviation calculation unit 45 calculates an absolute value $|\Delta\omega|$ of a deviation between the converted speed $\omega_c$ and the estimated speed value $\omega_e$. The absolute value $|\Delta\omega|$ of the deviation is input to the determination unit 46.

To the determination unit 46, a reference value $\omega_s$ is input in addition to the absolute value $|\Delta\omega|$ of the deviation. The reference value $\omega_s$ is a threshold for detecting coupling disconnection. The determination unit 46 compares the absolute value $|\Delta\omega|$ of the deviation with the reference value $\omega_s$, and determines that coupling disconnection has occurred when the absolute value $|\Delta\omega|$ of the deviation is larger than the reference value $\omega_s$, thereby outputting the disconnection detection signal $H_d$ to the gate drive circuit 8. Note that the disconnection detection signal $H_d$ is output to the gate drive circuit 8 in FIG. 6, but may be output to the circuit breaker 22 as in FIG. 5.

Note that although the coupling disconnection detecting unit 40A above is configured to input the start command $C_s$ to the speed conversion unit 44, the start command $C_s$ may be input to the determination unit 46. In the case of this configuration, the processings by the speed conversion unit 44, the deviation calculation unit 45, and the determination unit 46 are always performed regardless of the input of the start command $C_s$. Then, with the input of the start command $C_s$, a result of determination by the determination unit 46 is output to the gate drive circuit 8. Alternatively, regardless of the input of the start command $C_s$, the processings by the speed conversion unit 44 and the deviation calculation unit 45 are always performed. Then, with the input of the start command $C_s$, the determination unit 46 starts the operation, and a result of determination by the determination unit 46 is output to the gate drive circuit 8.

Figure 7:
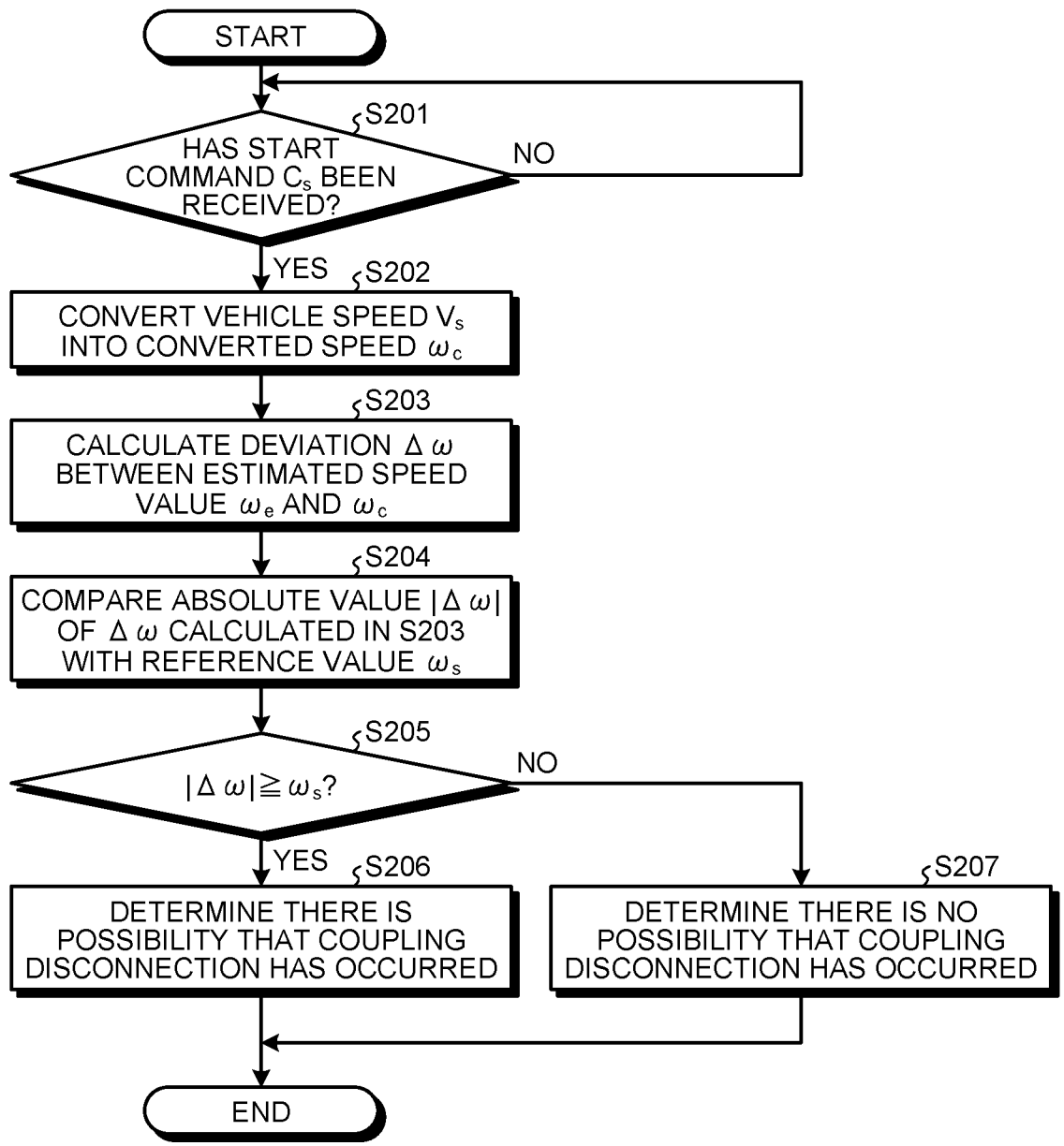
FIG. 7 is a flowchart illustrating an operation flow for detecting coupling disconnection in the second embodiment.

Next, an operation of detecting coupling disconnection in the second embodiment will be described with reference to FIGS. 6 and 7. FIG. 7 is a flowchart illustrating an operation flow for detecting coupling disconnection in the second embodiment. In FIG. 7, the processings in steps S201 and S202 are executed by the speed conversion unit 44, the processing in step S203 is executed by the deviation calculation unit 45, and the processings in steps S204 to S207 are executed by the determination unit 46.

In step S201, it is determined whether or not the start command $C_s$ has been received. If the start command $C_s$ has not been received (No in step S201), the processing in step S201 is repeated. If the start command $C_s$ has been received (Yes in step S201), the processing proceeds to step S202.

In step S202, the vehicle speed $V_s$ is converted into the converted speed $\omega_c$. In step S203, the deviation $\Delta\omega$ between the estimated speed value $\omega_e$ and the converted speed $\omega_c$ is calculated. In step S204, the absolute value $|\Delta\omega|$ of the deviation $\Delta\omega$ calculated in step S203 is compared with the reference value $\omega_s$. The reference value $\omega_s$ is set as a criterion value for preventing false detection due to noise or the like. That is, the reference value $\omega_s$ is a set value provided for improving the accuracy of the detection of coupling disconnection.

Here, if the absolute value $|\Delta\omega|$ is greater than or equal to the reference value $\omega_s$ (Yes in step S205), the processing proceeds to step S206. In step S206, it is determined that "coupling disconnection has occurred", and the processing flow in FIG. 7 is ended.

On the other hand, if the absolute value $|\Delta\omega|$ is less than the reference value $\omega_s$ (No in step S205), the processing proceeds to step S207. In step S207, it is determined that "coupling disconnection has not occurred", and the processing flow in FIG. 7 is ended.

Note that in the determination processing in step S205 above, if the absolute value $|\Delta\omega|$ is equal to the reference value $\omega_s$, the determination is "Yes" and the processing proceeds to step S206, but the determination may be "No" and the processing may proceed to step S207. That is, the determination may be either "Yes" or "No" if the absolute value $|\Delta\omega|$ is equal to the reference value $\omega_s$.

As described above, the electric vehicle controller according to the second embodiment can detect coupling disconnection of the induction motors 2 on the basis of the vehicle speed $V_s$ and the estimated speed value $\omega_e$. The method of the second embodiment need only use input information about the speed that is the vehicle speed $V_s$ and estimated information about the speed that is the estimated speed value $\omega_e$, whereby coupling disconnection of the induction motors 2 can be detected by a simple method.

Moreover, the electric vehicle controller according to the second embodiment can detect coupling disconnection of some of the plurality of induction motors 2, and stop the drive of the drive group including the induction motor 2 for which coupling disconnection has been detected. As a result, even when the drive of only one drive group including the induction motor 2 experiencing coupling disconnection is stopped, the operation of the electric vehicle can be continued by another drive group.

Note that although the disconnection detection signal $H_d$ is output to the gate drive circuit 8 in FIG. 6, the disconnection detection signal $H_d$ may be output to the circuit breaker 22 as in FIG. 5. Outputting the disconnection detection signal $H_d$ to the circuit breaker 22 can obtain the effect of the configuration illustrated in FIG. 5 described in the first embodiment.

Third Embodiment

Figure 8:
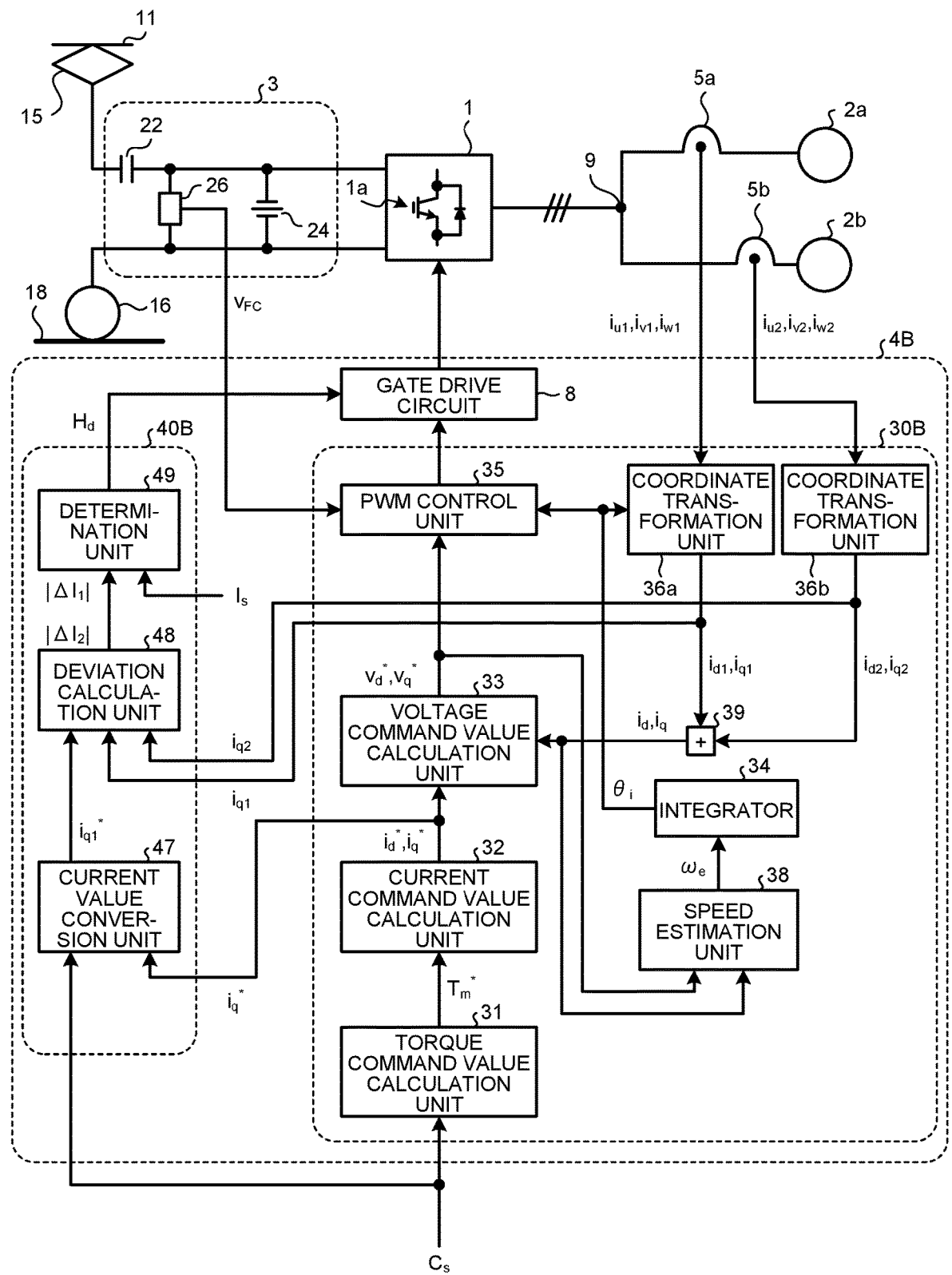
FIG. 8 is a block diagram illustrating a detailed configuration of a controller according to a third embodiment.

FIG. 8 is a block diagram illustrating a detailed configuration of a controller 4B according to a third embodiment.

The controller 4B according to the third embodiment includes a voltage controller 30B and a coupling disconnection detecting unit 40B.

The coupling disconnection detecting unit 40B is obtained by changing the configurations of the coupling disconnection detecting unit 40A of the second embodiment illustrated in FIG. 6 from the speed conversion unit 44 to a current value conversion unit 47, the deviation calculation unit 45 to a deviation calculation unit 48, and the determination unit 46 to a determination unit 49.

Moreover, the controller 4B according to the third embodiment has a configuration in which current detectors 5a and 5b are provided between the connection point 9 and the induction motors 2 instead of the configuration in which the current detector 5 is provided between the inverter 1 and the connection point 9. The voltage controller 30B is adapted to this configuration by replacing the coordinate transformation unit 36 with coordinate transformation units 36a and 36b and adding an adder 39. Also, FIG. 8 is adapted to this configuration by denoting the induction motor on the side of the current detector 5a as an induction motor 2a, and the induction motor on the side of the current detector 5b as an induction motor 2b.

Note that the other configurations are identical or equivalent to those of the second embodiment and are thus denoted by the same reference numerals as those in the second embodiment, whereby a redundant description will be omitted.

In the configuration of FIG. 8, the current detector 5a detects individual motor currents $i_{u1}$, $i_{v1}$, and $i_{w1}$ flowing to the induction motor 2a. The current detector 5b detects individual motor currents $i_{u2}$, $i_{v2}$, and $i_{w2}$ flowing to the induction motor 2b.

The detected values of the motor currents $i_{u1}$, $i_{v1}$, and $i_{w1}$ detected by the current detector 5a are input to the coordinate transformation unit 36a. The coordinate transformation unit 36a transforms the motor currents $i_{u1}$, $i_{v1}$, and $i_{w1}$ detected by the current detector 5a into d-axis and q-axis current values. The current values obtained after transformation are d-axis current $i_{d1}$ and q-axis current $i_{q1}$. The d-axis current $i_{d1}$ and the q-axis current $i_{q1}$ obtained after transformation by the coordinate transformation unit 36a are input to the adder 39. Also, out of the d-axis current $i_{d1}$ and the q-axis current $i_{q1}$, the q-axis current $i_{q1}$ is input to the deviation calculation unit 48 of the coupling disconnection detecting unit 40B.

The detected values of the motor currents $i_{u2}$, $i_{v2}$, and $i_{w2}$ detected by the current detector 5b are input to the coordinate transformation unit 36b. The coordinate transformation unit 36b transforms the motor currents $i_{u2}$, $i_{v2}$, and $i_{w2}$ detected by the current detector 5b into d-axis and q-axis current values. The current values obtained after transformation are d-axis current $i_{d2}$ and q-axis current $i_{q2}$. The d-axis current $i_{d2}$ and the q-axis current $i_{q2}$ obtained after transformation by the coordinate transformation unit 36b are input to the adder 39. Also, out of the d-axis current $i_{d2}$ and the q-axis current $i_{q2}$, the q-axis current $i_{q2}$ is input to the deviation calculation unit 48 of the coupling disconnection detecting unit 40B.

The adder 39 adds the d-axis current $i_{d1}$ and the d-axis current $i_{d2}$, adds the q-axis current $i_{q1}$ and the q-axis current $i_{q2}$, and outputs the added values to the voltage command value calculation unit 33 and the speed estimation unit 38. The output of the adder 39 is the d-axis current $i_d$ and the q-axis current $i_q$ obtained by adding the motor currents flowing to the induction motor 2a and the motor currents flowing to the induction motor 2b.

The coupling disconnection detecting unit 40B is a detection unit that detects disconnection of the coupling 54 provided on the rotary shaft 53 of the induction motor 2. When the induction motor 2 with the coupling 54 disconnected is driven, there is a difference between the actual motor currents flowing to the individual induction motors 2 and the q-axis current command value $i_q^*$ calculated on the basis of the torque command value $T_m^*$, and coupling disconnection can be detected by the difference. The difference is particularly noticeable at startup. Also, the difference is particularly noticeable in the q-axis current component. The coupling disconnection detecting unit 40B illustrated in FIG. 8 is configured using this principle.

To the current value conversion unit 47, the q-axis current command value $i_q^*$ calculated by the current command value calculation unit 32 and the start command $C_s$ are input. When the start command $C_s$ is input, the current value conversion unit 47 converts the q-axis current command value $i_q^*$, which is a q-axis command value for the motor currents flowing to the two induction motors 2a and 2b, into a q-axis current command value $i_{q1}^*$ for either one of the induction motor 2a and the induction motor 2b. The q-axis current command value $i_{q1}^*$ obtained after conversion by the current value conversion unit 47 is input to the deviation calculation unit 48.

In addition to the q-axis current command value $i_{q1}^*$, to the deviation calculation unit 48, the q-axis current $i_{q1}$ obtained by transformation by the coordinate transformation unit 36a and the q-axis current $i_{q2}$ obtained by transformation by the coordinate transformation unit 36b are input. The deviation calculation unit 48 calculates an absolute value $|\Delta I_1|$ of a deviation between the q-axis current command value $i_{q1}^*$ and the q-axis current $i_{q1}$, and an absolute value $|\Delta I_2|$ of a deviation between the q-axis current command value $i_{q2}^*$ and the q-axis current $i_{q2}$. The absolute values $|\Delta I_1|$ and $|\Delta I_2|$ of the deviations are input to the determination unit 49.

To the determination unit 49, a reference value $I_s$ is input in addition to the absolute values $|\Delta I_1|$ and $|\Delta I_2|$ of the deviations. The reference value $I_s$ is a threshold for detecting coupling disconnection. The determination unit 49 compares each of the absolute values $|\Delta I_1|$ and $|\Delta I_2|$ of the deviations with the reference value $I_s$. The determination unit 49 determines that coupling disconnection has occurred in the induction motor 2a when the absolute value $|\Delta I_1|$ of the deviation is larger than the reference value $I_s$, thereby outputting the disconnection detection signal $H_d$ to the gate drive circuit 8. Also, the determination unit 49 determines that coupling disconnection has occurred in the induction motor 2b when the absolute value $|\Delta I_2|$ of the deviation is larger than the reference value $I_s$, thereby outputting the disconnection detection signal $H_d$ to the gate drive circuit 8. Note that the disconnection detection signal $H_d$ is output to the gate drive circuit 8 in FIG. 8, but may be output to the circuit breaker 22 as in FIG. 5.

FIG. 8 illustrates the configurations in which the q-axis current command value $i_q^*$ is input to the current value conversion unit 47, and the q-axis current command value $i_{q1}^*$, the q-axis current $i_{q1}$, and the q-axis current $i_{q2}$ are input to the deviation calculation unit 48, but the present invention is not limited to these configurations. In addition to these configurations, the d-axis current command value $i_d^*$ may be input to the current value conversion unit 47, and the d-axis current command value $i_{d1}^*$, the d-axis current $i_{d1}$, and the d-axis current $i_{d2}$ may be input to the deviation calculation unit 48. That is, in addition to the command values and the current values of the q-axis current, the command values and the current values of the d-axis current may be used for the determination of coupling disconnection.

Moreover, although the coupling disconnection detecting unit 40B above is configured to input the start command $C_s$ to the current value conversion unit 47, the start command $C_s$ may be input to the determination unit 49. In the case of this configuration, the processings by the current value conversion unit 47, the deviation calculation unit 48, and the determination unit 49 are always performed regardless of the input of the start command $C_s$. Then, with the input of the start command $C_s$, a result of determination by the determination unit 49 is output to the gate drive circuit 8. Alternatively, regardless of the input of the start command $C_s$, the processings by the current value conversion unit 47 and the deviation calculation unit 48 are always performed. Then, with the input of the start command $C_s$, the determination unit 49 starts the operation, and a result of determination by the determination unit 49 is output to the gate drive circuit 8.

Figure 9:
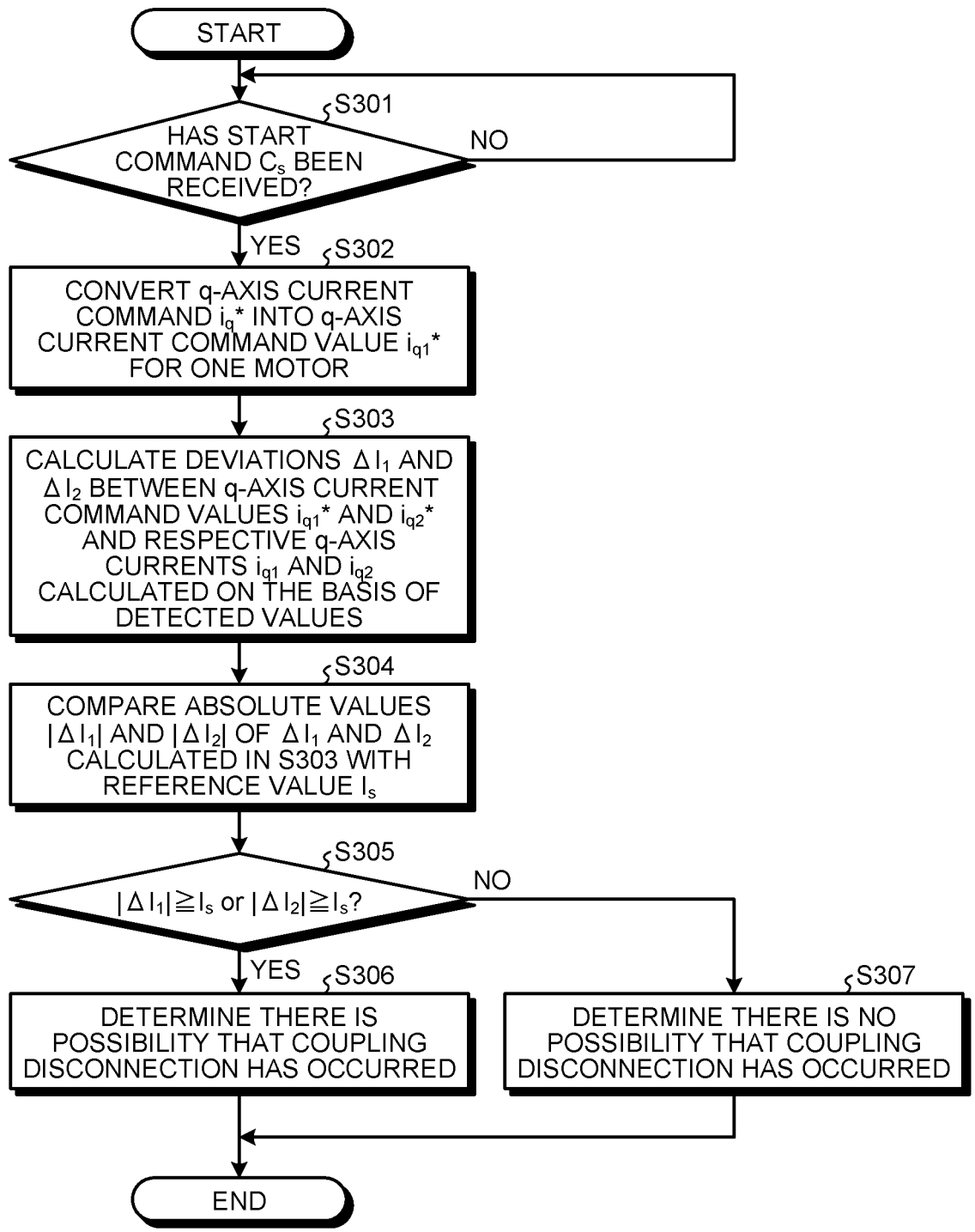
FIG. 9 is a flowchart illustrating an operation flow for detecting coupling disconnection in the third embodiment.

Next, an operation of detecting coupling disconnection in the third embodiment will be described with reference to FIGS. 8 and 9. FIG. 9 is a flowchart illustrating an operation flow for detecting coupling disconnection in the third embodiment. In FIG. 9, the processings in steps S301 and S302 are executed by the current value conversion unit 47, the processing in step S303 is executed by the deviation calculation unit 48, and the processings in steps S304 to S307 are executed by the determination unit 49.

In step S301, it is determined whether or not the start command $C_s$ has been received. If the start command $C_s$ has not been received (No in step S301), the processing in step S301 is repeated. If the start command $C_s$ has been received (Yes in step S301), the processing proceeds to step S302.

In step S302, the q-axis current command value $i_q^*$ is converted into the q-axis current command value $i_{q1}^*$ for one motor. In step S303, deviations $\Delta I_1$ and $\Delta I_2$ between the q-axis current command values $i_{q1}^*$ and $i_{q2}^*$ and the q-axis currents $i_{q1}$ and $i_{q2}$ calculated on the basis of the detected values are calculated, respectively. In step S304, the absolute values $|\Delta I_1|$ and $|\Delta I_2|$ of the deviations $\Delta I_1$ and $\Delta I_2$ calculated in step S303 are compared with the reference value $I_s$.

Here, if at least one of the absolute values $|\Delta I_1|$ and $|\Delta I_2|$ is larger than or equal to the reference value $I_s$ (Yes in step S305), the processing proceeds to step S306. In step S306, it is determined that "coupling disconnection has occurred", and the processing flow in FIG. 9 is ended.

On the other hand, if the absolute values $|\Delta I_1|$ and $|\Delta I_2|$ are both less than the reference value $I_s$ (No in step S305), the processing proceeds to step S307. In step S307, it is determined that "coupling disconnection has not occurred", and the processing flow in FIG. 9 is ended.

Note that in the determination processing in step S305 above, if the absolute values $|\Delta I_1|$ and $|\Delta I_2|$ are equal to the reference value $I_s$, the determination is "Yes" and the processing proceeds to step S306, but the determination may be "No" and the processing may proceed to step S307. That is, the determination may be either "Yes" or "No" if the absolute values $|\Delta I_1|$ and $|\Delta I_2|$ are equal to the reference value $I_s$.

As described above, the electric vehicle controller according to the third embodiment can detect coupling disconnection of the induction motors 2 on the basis of the q-axis currents $i_{q1}$ and $i_{q2}$, which are calculated on the basis of the detected values of the individual motor currents flowing to the corresponding induction motors 2a and 2b, and the q-axis current command value $i_{q1}^*$ for one motor calculated on the basis of the q-axis current command value $i_q^*$. As described above, the q-axis currents $i_{q1}$ and $i_{q2}$ can be calculated using the detected values of the currents flowing to the corresponding induction motors 2a and 2b. Accordingly, the method of the third embodiment need only use a control parameter that is the q-axis current command value $i_q^*$ and detected information of the current detectors 5a and 5b, and thus can detect coupling disconnection of the induction motors 2 by a simple method.

Moreover, the electric vehicle controller according to the third embodiment can detect coupling disconnection of the induction motor 2a or 2b, and stop the drive of the drive group including the induction motor 2a or 2b for which coupling disconnection has been detected. As a result, even when the drive of only one drive group including the induction motor 2a or 2b experiencing coupling disconnection is stopped, the operation of the electric vehicle can be continued by another drive group.

The electric vehicle controller according to the third embodiment can also identify which of the induction motors 2a and 2b has coupling disconnection. This can achieve an effect that troubleshooting and maintenance work are performed more easily than the electric vehicle controllers of the first and second embodiments.

Note that although the disconnection detection signal $H_d$ is output to the gate drive circuit 8 in FIG. 8, the disconnection detection signal $H_d$ may be output to the circuit breaker 22 as in FIG. 5. Outputting the disconnection detection signal $H_d$ to the circuit breaker 22 can obtain the effect of the configuration illustrated in FIG. 5 described in the first embodiment.

Lastly, a hardware configuration that implements the functions of the coupling disconnection detecting unit 40 in the first embodiment, the functions of the coupling disconnection detecting unit 40A in the second embodiment, and the functions of the coupling disconnection detecting unit 40B in the third embodiment will be described with reference to FIGS. 10 and 11.

Figure 10:
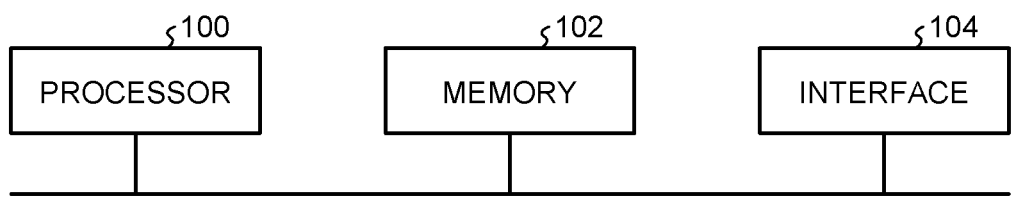
FIG. 10 is a block diagram illustrating an example of a hardware configuration that implements the functions of a coupling disconnection detecting unit in the first, second, and third embodiments.

When implementing each function of the coupling disconnection detecting unit 40, the coupling disconnection detecting unit 40A, or the coupling disconnection detecting unit 40B, the hardware can include a processor 100 that performs an arithmetic operation, a memory 102 that saves a program read by the processor 100, and an interface 104 that inputs and outputs signals as illustrated in FIG. 10.

The processor 100 may be an arithmetic unit, a microprocessor, a microcomputer, a central processing unit (CPU), or a digital signal processor (DSP). The memory 102 can include, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disc, or a digital versatile disc (DVD).

The memory 102 stores a program that executes each function of the coupling disconnection detecting unit 40, the coupling disconnection detecting unit 40A, or the coupling disconnection detecting unit 40B. The processor 100 transmits and receives necessary information via the interface 104 and also executes the program stored in the memory 102, thereby executing various types of arithmetic processing described in the first, second, and third embodiments. A result of the processing by the processor 100 can be stored in the memory 102.

Figure 11:
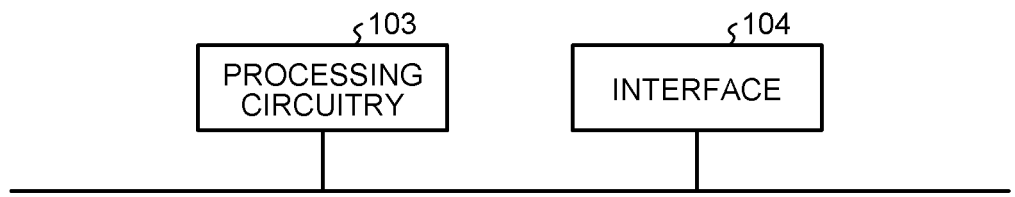
FIG. 11 is a block diagram illustrating another example of the hardware configuration that implements the functions of the coupling disconnection detecting unit in the first, second, and third embodiments.

Moreover, the processor 100 and the memory 102 illustrated in FIG. 10 may be replaced with processing circuitry 103 as in FIG. 11. The processing circuitry 103 corresponds to a single circuit, a complex circuit, a programmed processor, a parallel-programmed processor, an application specific integrated circuit (ASIC), a field programmable gate array (FPGA), or a combination of those.

The configuration illustrated in the aforementioned embodiment merely illustrates an example of the content of the present invention, and can thus be combined with another known technique or partially omitted and/or modified without departing from the scope of the present invention.

Reference Signs List 1 inverter; 1a switching element; 2, 2a, 2b induction motor; 3 input circuit; 4, 4A, 4B controller; 5, 5a, 5b current detector; 8 gate drive circuit; 9 connection point; 11 overhead line; 15 pantograph; 16 wheel; 18 rail; 22 circuit breaker; 24 filter capacitor; 26 voltage detector; 30, 30A, 30B voltage controller; 31 torque command value calculation unit; 32 current command value calculation unit; 33 voltage command value calculation unit; 34 integrator; 35 PWM control unit; 36, 36a, 36b coordinate transformation unit; 38 speed estimation unit; 39 adder; 40, 40A, 40B coupling disconnection detecting unit; 41 torque estimation unit; 42, 45, 48 deviation calculation unit; 43, 46, 49 determination unit; 44 speed conversion unit; 47 current value conversion unit; 50 first drive group; 52 second drive group; 53 rotary shaft; 54 coupling; 55 motor-side gear; 56 wheel-side gear; 57 axle; 80 electric vehicle drive system; 100 processor; 102 memory; 103 processing circuitry; 104 interface.

The invention claimed is:

1. An electric vehicle controller that controls travel of an electric vehicle by a drive control system, comprising:
the drive control system including:
a plurality of induction motors,
one inverter to drive the plurality of induction motors,
a current detector to detect a total current that is a sum of motor currents flowing to the plurality of induction motors, and
an inverter controller to control the inverter on the basis of:
a current command value calculated on the basis of a torque command value,
a voltage command value calculated on the basis of the detected total current, and
an estimated speed value calculated on the basis of the calculated voltage command value and the detected total current,
wherein the drive control system is not provided with a speed sensor for detecting a rotational speed of each of the plurality of induction motors, and the inverter controller is a controller that performs speed-sensorless control that does not use a value detected by a speed sensor for control, and
wherein the inverter controller includes processing circuitry to:
calculate an estimated torque value on the basis of the detected total current and the calculated voltage command value, and
detect disconnection of a coupling provided between one of the plurality of induction motors and a wheel of the electric vehicle on the basis of the estimated torque value and the torque command value.

2. The electric vehicle controller according to claim 1, wherein the processing circuitry further:

calculates an absolute value of a deviation between the torque command value and the estimated torque value;
compares the absolute value of the deviation with a reference value; and
determines that coupling disconnection has occurred when the absolute value of the deviation is larger than the reference value.

3. An electric vehicle controller that controls travel of an electric vehicle by a drive control system, comprising:
the drive control system including:
a plurality of induction motors,
one inverter to drive the plurality of induction motors,
a current detector to detect a total current being a sum of motor currents flowing to the plurality of induction motors, and
an inverter controller to control the inverter on the basis of:
a voltage command value calculated on the basis of a torque command value and the detected total current, and
an estimated speed value calculated on the basis of the calculated voltage command value and the detected total current,
wherein the drive control system is not provided with a speed sensor for detecting a rotational speed of each of the plurality of induction motors, and the inverter controller is a controller that performs speed-sensorless control that does not use a value detected by a speed sensor for control, and
wherein the inverter controller includes processing circuitry to detect disconnection of a coupling provided between one of the plurality of induction motors and a wheel of the electric vehicle on the basis of the estimated speed value and a rotational speed of the plurality of induction motors calculated using a traveling speed of the electric vehicle.

4. The electric vehicle controller according to claim 3, wherein the processing circuitry further:
converts the traveling speed of the electric vehicle into the rotational speed of the plurality of induction motors;
calculates an absolute value of a deviation between the calculated rotational speed and the estimated speed value;
compares the absolute value of the deviation with a reference value, and
determines that coupling disconnection has occurred when the absolute value of the deviation is larger than the reference value.

5. An electric vehicle controller that controls travel of an electric vehicle by a drive control system, comprising:
the drive control system including:
a plurality of induction motors,
one inverter to drive the plurality of induction motors,
a plurality of current detectors to correspondingly detect individual motor currents flowing to the plurality of induction motors, and
an inverter controller to control the inverter on the basis of:
a current command value calculated on the basis of a torque command value,
a voltage command value calculated on the basis of an added value of motor currents transformed from the detected individual motor currents, and
an estimated speed value calculated on the basis of the calculated voltage command value and the added value of the transformed motor currents, wherein the drive control system is not provided with a speed sensor for detecting a rotational speed of each of the plurality of induction motors, and the inverter controller is a controller that performs speed-sensorless control that does not use a value detected by a speed sensor for control, and wherein the inverter controller includes processing circuitry to detect disconnection of a coupling provided between one of the plurality of induction motors and a wheel of the electric vehicle on the basis of:
- a q-axis current calculated on the basis of each of the detected individual motor currents flowing to the plurality of induction motors, and
- a q-axis current command value of the calculated current command value.

6. The electric vehicle controller according to claim 5, wherein the processing circuitry further:

converts the q-axis current command value into a q-axis current command value for one of the plurality of induction motors;

calculates an absolute value of a deviation between the calculated q-axis current and the converted q-axis current command value;

compares the absolute value of the deviation with a reference value; and determines that coupling disconnection has occurred when the absolute value of the deviation is larger than the reference value.

* * * * *